Sept. 21, 1965  A. H. GUBER  3,207,033
ENTERTAINMENT AND DISPLAY DEVICE
Original Filed Jan. 26, 1962  3 Sheets-Sheet 1

INVENTOR.
ARTHUR H. GUBER
BY
ATTORNEYS

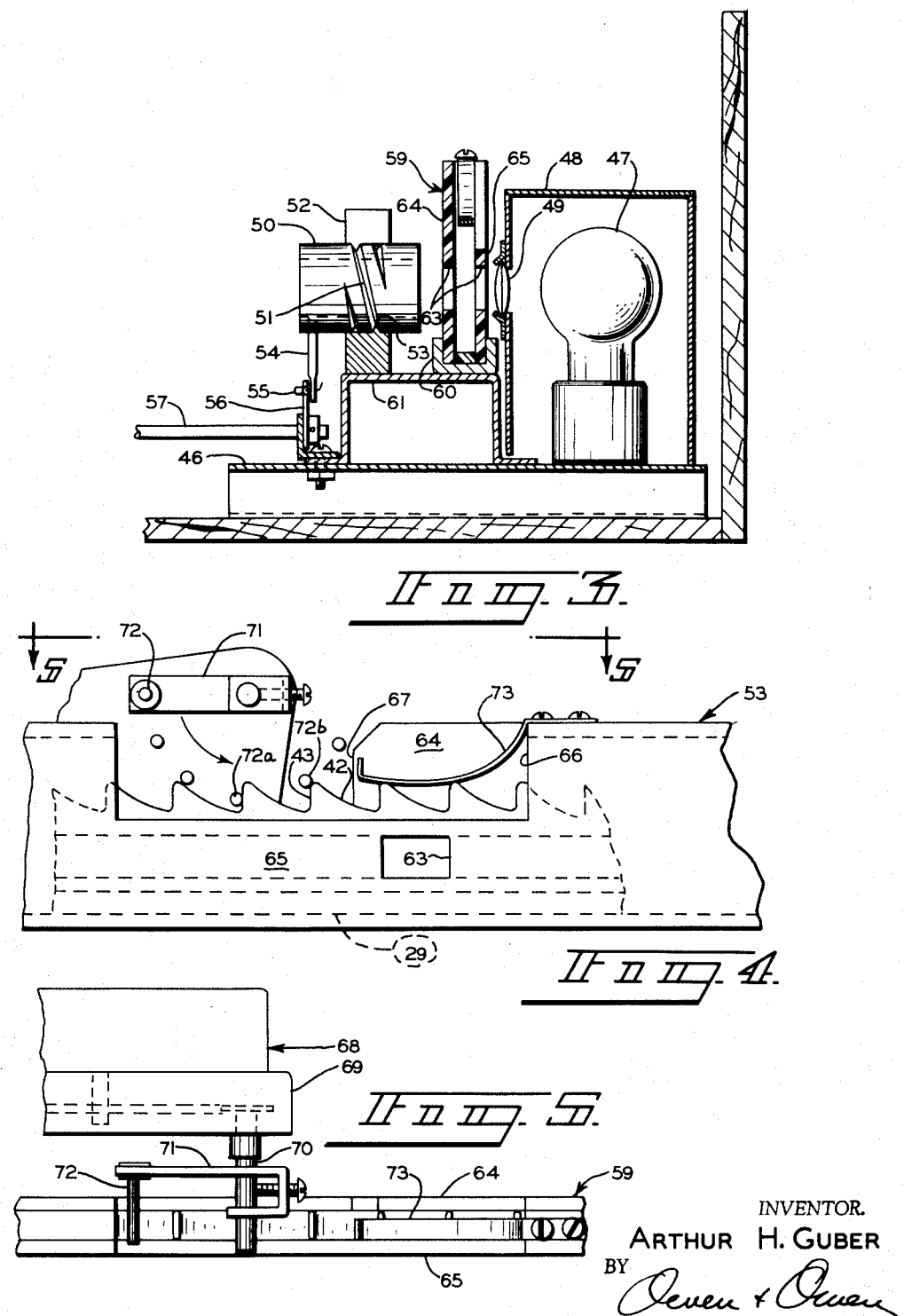

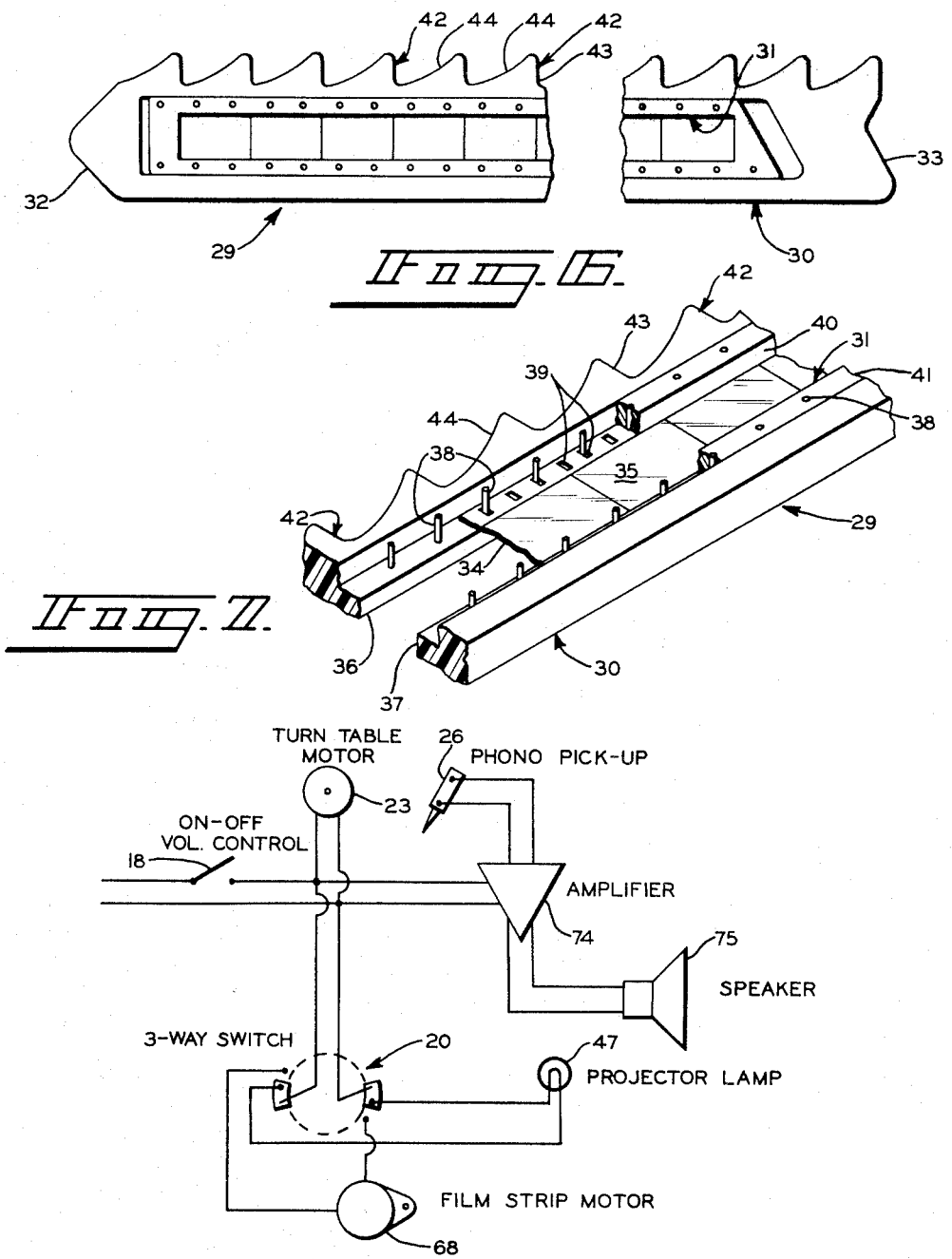

United States Patent Office 3,207,033
Patented Sept. 21, 1965

3,207,033
ENTERTAINMENT AND DISPLAY DEVICE
Arthur H. Guber, Toledo, Ohio, assignor, by mesne assignments, to Dodge-Audio Visual Corporation, Toledo, Ohio, a corporation of Ohio
Continuation of application Ser. No. 168,932, Jan. 26, 1962. This application Jan. 14, 1965, Ser. No. 431,756
6 Claims. (Cl. 88—28)

This application is a continuation of my earlier application Serial No. 168,932, filed January 26, 1962, now abandoned.

This invention relates to an entertainment and display device and, more particularly, to a device for the simultaneous display of projected photographs, pictures or drawings and presentation of an aural message related to the pictures, photographs or drawings being displayed, the two being presented serially and in substantial synchronization.

The simultaneous display of motion or still pictures during the presentation of an aural message delivered from a phonograph record, tape recorder or other source has become very popular for the presentation of entertainment and of educational material. For example, projectors have been designed employing strip films and having actuating levers for moving the films one frame at a time in response to signals received from the aural message being played off a phonograph record or tape recorder; others have slide handling mechanisms. In some instances, an operator hears the signal or key part of the message and actuates the frame advancing or slide changing means; in other apparatuses automatic mechanisms of greater or less complexity have been devised which advance the projection film or change the slide automatically as the signal is played by the audio portion of the apparatus.

Several drawbacks exist in most of the previously devised units for the simultaneous presentation of aural messages and visual images which are keyed together. These drawbacks include the audibility of the signal by which an operator is required to advance the film, the necessity for an operator in the first place, or the cost of the expensive synchronizing mechanism by which the film or other picture source is advanced in synchronism with the aural message.

It is the principal object of the instant invention therefore to provide a simple, inexpensive device for the presentation of entertainment material or displays consisting of correlated, serially presented aural messages and visual images wherein elaborate and costly synchronizing means are not required and wherein an audible message to an operator is not needed in order to advance the images in substantial synchronization with the aural message.

It is yet another object of the instant invention to provide a simple, lightweight and inexpensive entertainment and display device for the simultaneous presentation of an aural program from a phonograph record and a visual program comprising a series of images on an elongated multi-frame film strip keyed together in substantial synchronization by means for rotating a film strip driver in synchronism with the rotation of the turntable for the phonograph record.

It is yet another object of the instant invention to provide an entertainment and display device for the presentation of correlated aural and visual messages from a phonograph record and a multi-frame film strip wherein the substantial synchronization of the two is achieved by means for rotating a film driver which consists of a substantially constant speed motor and thus is synchronized with a similar motor for rotating the phonograph turntable.

These and other more specific objects and advantages of an entertainnment and display device embodying the invention will be better understood from the description which follows and from the drawings in which:

FIG. 3 is a fragmentary, vertical sectional view on an enlarged scale taken along the line 3—3 of FIG. 2 and illustrating the image projection system of the device;

FIG. 4 is a fragmentary, vertical sectional view on an enlarged scale taken along the line 4—4 of FIG. 2 and showing the film advancing mechanism by which images are serially presented to the projection system;

FIG. 5 is a fragmentary, horizontal view on an enlarged scale taken substantially from the position indicated by the line 5—5 of FIG. 4;

FIG. 6 is a fragmentary view on an enlarged scale in elevation of a film carrier usable with a device embodying the invention;

FIG. 7 is a fragmentary view on an enlarged scale in perspective, with parts broken away, of a portion of the film carrier illustrated in FIG. 6; and FIG. 8 is a simplified wiring diagram of the device embodying the invention.

Figure 1:
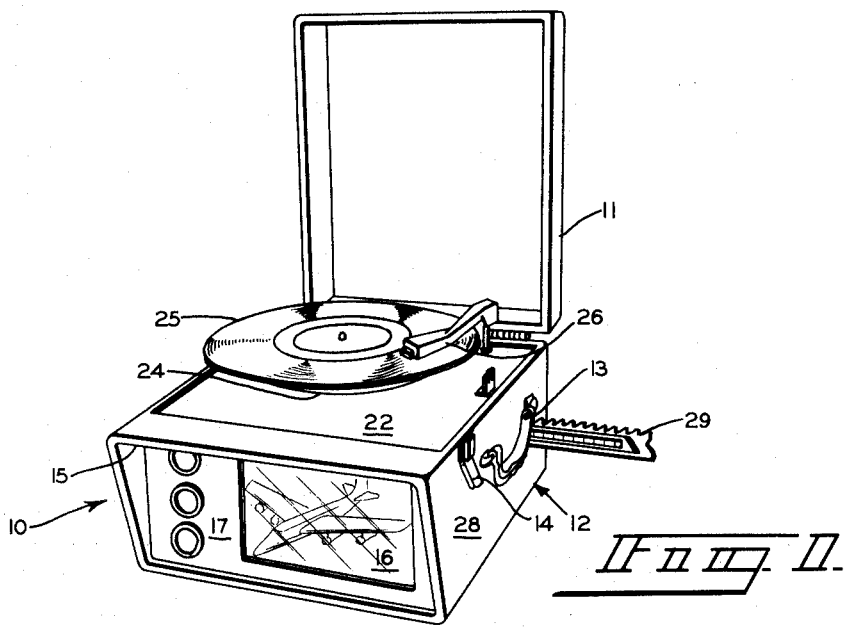
FIG. 1 is a view in perspective on a small scale of a device embodying the invention.

A device embodying the invention for the presentation of both aural and visual material which are related to each other is generally indicated in FIG. 1 by the reference number 10. The device is housed within a cabinet comprising a lid 11 and a case 12, the case 12 having a carrying handle 13 and lid locks 14. The front end of the case 12 is so shaped so as to provide a light hood 15 for shielding a back image screen generally indicated by the reference number 16, and which is mounted in a suitable opening in a front wall 17 of the case 12. Adjacent the screen 16 are positioned three control knobs which consist of a conventional "on-off volume control" knob 18, a knob 19 for a three-way switch 20 (see FIG. 8) and a knob 21 for focusing the projection system to present a clear image on the screen 16.

Figure 2:
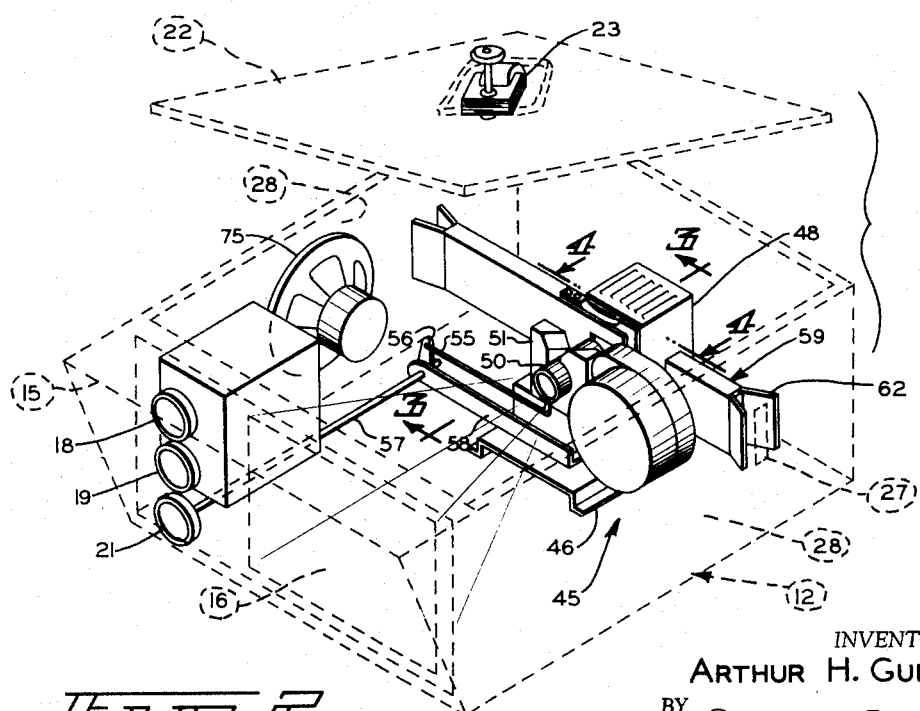
FIG. 2 is a phantom view in perspective showing the component operative parts of a device embodying the invention in their relationship to each other in the interior of a cabinet for enclosing the same, the cabinet being shown only in dotted lines.

A top plate 22 for the case 12 mounts a synchronous turntable motor 23 (FIGS. 2 and 8) which carries a turntable 24 for long playing record 25. A pickup arm 26 is also mounted by the top plate 22 of the case 12. Horizontally aligned slots 27 are cut through side walls 28 of the case 12 near the rear for the reception and discharge of a film strip carrier 29.

The film strip carrier 29 (see FIGS. 6 and 7 particularly) comprises a back piece 30 and a snap-in retainer 31. The back piece 30 has a pointed front end 32 and a recessed rear end 33 to give the impression of an arrow indicating the direction in which the carrier 29 is to be inserted through the slot 27 in the right side of the case 12. The film strip carrier 29, as an entire unit, forms a frame for a strip of film 34 on which are the images to be projected by the projection system onto the viewing screen 16. In the embodiment of the invention illustrated in the drawings, the film 34 is a 16 mm. film and each image, for example the image occupying the space indicated by the reference number 35, is two "frames" in width and one "frame" in height. The screen 16 is similarly proportioned in height and width.

The back piece 30 of the carrier 29 has an upper rail 36 and a lower rail 37 which are spaced to delineate the edges of the images on the film and which have recessed shoulders on which are erected a plurality of pins 38. The pins 38 are of such diameter as to slide through conventional sprocket openings 39 in the edges of the film strip 34 and are spaced from each other twice the distance between successive ones of the sprocket openings 39. The retainer 31 is an open frame comprising two side bars 40 and 41 of such size as to enter the recesses formed in the rails 36 and 37 of the back piece 30. The bars 40 and 41 of the retainer 31 are provided with series of openings for the reception of the pins 38 so that the retainer 31 may be pressed in place in the film recess in the carrier 29.

The upper rail 36 of the carrier 29, has a series of projections 42 shaped generally like sawteeth in side elevation, each of the projections 42 having a straight edge 43 and an inclined edge 44. The longitudinal spacing between the successive straight edges 43 of the teeth 42 is equal to the width of one of the images 35, i.e., is equal to the height of two "frames" on the film 34, and, as can be seen in FIGS. 6 and 7, the vertical edges 43 of the projections 42 are aligned with the lines of demarcation between the successive ones of the image spaces on the film 34.

Interiorly of the case 12 there is mounted a film projection and advancing unit generally indicated by the reference number 45. The unit 45 is supported in the case 12 upon a stand 46 and consists of two mechanisms, the first being a projection system illustrated in FIG. 3 and the second being a strip advancing system illustrated in FIGS. 4 and 5.

The projection system comprises a projection lamp 47 which is housed within a ventilated container 48 in one wall of which there is mounted a lens 49. The lens 49 is axially aligned with a projection lens carrier 50. The projection lens carrier 50 is cylindrical and has a thread 51 formed in its outer surface. The projection lens carrier 50 is mounted for rotation in a U block 52 which has a raised thread 53 (FIG. 3) in its bottom and side walls and is open at the top to enable the lens carrier 50 to be inserted into and removed therefrom. The raised thread 53 engages with the thread 51 in the exterior surface of the lens carrier 50 so that rotation of the lens carrier 50 advances or retracts it relative to the film and thus focuses the image upon the projection screen 16.

The lens carrier cylinder 50 is connected by a downwardly extending pin 54 and a linking rod 55 to a crank arm 56 that is pinned on the rear end of a shaft 57. The shaft 57 is rotatably supported in the end of a support arm 58 extending outwardly from the stand 46. The shaft 57 extends forwardly horizontally and through the front wall 17 of the case 12, the focusing knob 21 being mounted on its outer end. Rotation of the knob 21 thus swings the crank 56 and, through the linking rod 55 and pin 54, rotates the lens carrier 50 in the U block 52 to accomplish the focusing of the image on the screen 16.

A hollow rectangular guide 59 for the film carrier 29 extends horizontally across between the side walls 28 of the case 12, being aligned with the slots 27 therein, and is supported by a channel 60 (FIG. 3) mounted on a stand 61 which also supports the U block 52 on the lower stand 46. At the ends of the guide 59 its side walls are flared out to form insert guides 62 for aligning the film carrier 29 when it is inserted through the slot 27 in the right wall of the case 12. The guide 59 extends across between the lens 49 and the adjustable lens carrier 50 and has projection apertures 63 in its side walls 64 and 65 which are optically aligned with the lens system and of a size equal to an image size on the film 34.

The side wall 65 is cut away to form a rectangular notch 66 of such depth as to expose the sawtooth projections 42 on the carrier 29 and the other side wall 64 is also cut away to form a rectangular notch 67 similarly to expose the sawtooth projections 42 of the film carrier 29. A synchronous motor 68 is mounted on the stand 46 adjacent the guide 59 and has a speed reduction gear box 69 with an output shaft 70. A feeding arm 71 is mounted on the shaft 70 and a drive pin 72 is positioned in the end of the arm 71. The pin 72 extends across the width of the space between the walls 64 and 65 of the carrier guide 59. The shaft 70 is so located and the arm 71 is of such length that the pin 72 is swung downwardly through the space provided by the notches 66 and 67 and into engagement with the straight edges 43 of the sawtooth projections 42 on the carrier 29 as is indicated in FIG. 4. Rotation of the motor 68 and of its output shaft 70 swings the arm 71 around so that it engages one of the projections 42 and moves the carrier 29 an image distance before it disengages from that one of the projections 42. The pin 72 is indicated at the engaging position by the reference number 72a in FIG. 4 and at the disengaging position by the reference number 72b. Thus each rotation of the output shaft 70 of the motor 68 advances the film strip carrier 29 one image distance. The rotary film driver comprising the arm 71 and drive pin 72 is thus rotated in synchronism.

A friction clip 73 is mounted on the guide 59 and extends downwardly into engagement with the projections 42 on the carrier 29.

When a person wishes to operate the device, he inserts the carrier 29 through the slot 27 and into the carrier guide 59 until its pointed end 32 and the first of the projections 42 engages the clip 64. This positions the carrier 29 so that upon one revolution of the motor shaft 70 the first film image will be moved into alignment with the aperture 63 and the lens carrier 59 on the optical axis of the projection system.

Initiation of the operation of the device is readily accomplished through the use of the three control knobs 19, 20 and 21. The operator places a record upon the turntable 22, the record being suitably entitled so as to be matched with a particular film strip carrier 29 for the same program. The operator then inserts the film strip 29 through the insert slot 27 until it engages with the clip 73 as discussed above. The operator turns the knob 18 to turn the device on and to warm an amplifier 74 (see FIG. 8—not shown in FIG. 2) which is also enclosed within the case 12 and which is properly connected to the pickup 26 and to a loud speaker 75 mounted in one of the side walls 28 of the case 12. This also starts rotation of the turntable motor 23 upon which the operator has placed the record. The operator then turns the knob 19 to the first position of the switch 20 as illustrated in FIG. 8. This first position allows current to flow to the projector lamp 47 but does not apply current to the film strip feeding motor 68. The operator then advances the film carrier 29 by hand until the image of the first frame appears on the screen 16 and rotates the focusing knob 21 until the image on the screen 16 is in focus. The operator then rotates the knob 21 to turn the switch 20 to its second position and thus to connect the film strip advancing motor 68 into the circuit to start the rotation of the feeding pin 72. When the feeding motor 68 has rotated the driving pin 72 a distance sufficient for it to engage the first of the projections 42, the film strip carrier 29 starts to move and the operator then turns the knob 21 to return the switch to its first position, stopping movement of the film strip carrier 29.

The operator then puts the needle of the pickup arm 26 on the record and when the sound commences, turns the knob 21 and switch 20 back to its second position to re-energize the feeding motor 68. Thereafter, the continuous operation of the two synchronous motors 23 and 68 and the timing of the recording being played, automatically produce substantial synchronism between the aural message and the image on the screen 16 for the remainder of the program on one side of the record 25 and on one film strip carrier 29.

Having described my invention, I claim:

1. An entertainment and display device comprising, in combination, a case having a front wall, side walls, back, bottom, and a hinged lid, a top plate closing the interior of said case, a phonograph turntable and pickup arm mounted on said top plate, said front wall having a rectangular cutout and a back image screen mounted therein, a projection system mounted in said case in direct optical alignment with said screen, said projection system including a projection lens cylinder, an open topped U block for mounting said cylinder in optical alignment, cooperating engageable threads on said cylinder and said U block, an arm on said cylinder, a horizontal, rotatably mounted shaft extending forwardly through said front wall and having a knob on its exposed end, a crank and link connecting said shaft and said cylinder arm whereby rotation of said knob rotates said cylinder for focusing an image in the image plane of said projection system on said screen, horizontally aligned openings in said side walls, a horizontal film strip guide extending therebetween and across the optical path of said projection system from side to side, a multi-frame film strip carrier adapted to slide through said guide from side to side with the images thereon in the focal plane of said projection system, said carrier having a series of projections spaced therealong in alignment with the image frames on the film strip carried thereby, a constant speed film feeding motor and transmission mounted adjacent said guide, an output shaft on said transmission, an arm on said output shaft, a single projection engaging pin on said arm, said shaft arm and pin being located and aligned for engagement of said pin with said successive ones of said projections on said film strip carrier, whereby each rotation of said output shaft and engagement of said pin with one of said projections moves said film strip carrier a single image distance for serially moving said film strip through said projection system, a constant speed motor for said turntable, an amplifier and speaker mounted in said case and operatively connected to said pickup arm, an on-off and volume control knob for said turntable motor and said amplifier mounted on said front wall, a three-way switch with its control knob mounted on said front wall adjacent said on-off knob and said focusing knob, said switch being electrically connected in series with said on-off knob and having a first position for energizing said projection system only and a second position for energizing said projection system and said film feeding motor, and an overlying incident light hood extending forwardly from said front wall over said screen.

2. An entertainment and display device for simultaneous correlated production of auditory and visual material, said device consisting of
(1) a case,
(2) a phonograph turntable and pickup arm mounted on the top of said case,
(3) a projection system mounted in said case,
(4) an elongated film strip holder for carrying a film strip consisting of a plurality of film frames each corresponding to a part of the auditory material on a companion record and being arranged in sequence corresponding to the sequence of the auditory material on such record,
(5) means mounted in said case having an opening accessible to the exterior of said case for the reception of the leading end of said holder and for guiding said film strip in said holder along a longitudinal path extending across said case and across an optical path of said projection system,
(6) an electric motor for rotating said turntable,
(7) a rotary driver,
(8) means for rotating said driver in synchronism with the rotation of said turntable,
(9) said driver having an engager mounted thereon for rotation therewith,
(10) means for intermittently advancing said film strip holder from frame to frame along said guide means, said means including a plurality of equally spaced fingers the distances therebetween being proportionate to the distance between centers of the frames on said film strip, said fingers being positioned for actuation by said engager on said rotary driver for advancing said film strip holder in timed sequential relation to the presentation of the auditory material,
(11) and a back image screen mounted at the front of said case upon which said projection system is adapted to focus images from said film strip.

3. A device according to claim 2 in which the motor for said phonograph turntable is synchronous and said means for rotating said driver in synchronism with the rotation of said turntable is a second synchronous motor.

4. A device according to claim 2 in which the fingers included in the means for intermittently advancing said film strip holder are projections spaced along an edge of said film strip holder.

5. A device according to claim 2 in which said film strip holder consists of
(1) an elongated back piece having parallel spaced side rails for supporting the edges of a multiple-frame film strip, said side rails defining therebetween a continuous open area extending lengthwise of said film strip and having a predetermined width, each of said side rails having a recessed shoulder along its inner edge and
(2) a retaining front piece having parallel side rails spaced a distance equal to such predetermined width defined by the side rails of said back, said front piece being adapted to retain said film strip against said recessed shoulders.

6. A device according to claim 2 in which the projection system includes a focusing mechanism comprising, a tubular projection lens holder, means mounted fixedly relative to said case and extending angularly relative to the axes of said lens holder and a manually graspable member extending outside of said case and engaged with said means for moving said lens holder axially.

References Cited by the Examiner
UNITED STATES PATENTS

| | | | |
|---|---|---|---|
| 1,482,387 | 2/24 | Donaldson | 352—15 |
| 2,092,761 | 9/37 | Klein | 274—1 |
| 2,098,216 | 11/37 | Andres | 274—1 |
| 2,279,119 | 4/42 | Freiman | 274—1 |
| 2,378,416 | 6/45 | Like | 274—8 |
| 2,491,944 | 12/49 | Abrahams et al. | 88—28 |
| 2,631,495 | 3/53 | Ronick | 274—1 |
| 3,138,061 | 6/64 | Greenaway | 88—27 |

NORTON ANSHER, *Primary Examiner.*